(12) United States Patent
Ishimori

(10) Patent No.: US 6,840,029 B2
(45) Date of Patent: Jan. 11, 2005

(54) LAWN MOWER HAVING A DISPLACEABLE GRASS CATCHER

(75) Inventor: Shoso Ishimori, Sakai (JP)

(73) Assignee: Kubota Corporation, Osaka (JP)

(*) Notice: Subject to any disclaimer, the term of this patent is extended or adjusted under 35 U.S.C. 154(b) by 139 days.

(21) Appl. No.: 10/229,963

(22) Filed: Aug. 28, 2002

(65) Prior Publication Data

US 2004/0079063 A1 Apr. 29, 2004

(30) Foreign Application Priority Data

Dec. 4, 2001 (JP) ......................... 2001-370079

(51) Int. Cl.$^7$ .......................... A01D 43/00; A01D 43/06
(52) U.S. Cl. ....................................... 56/202
(58) Field of Search ...................... 56/202, 16.6, 320.2, 56/199, DIG. 9, DIG. 18, 205, 203, 204, 206

(56) References Cited

U.S. PATENT DOCUMENTS

| | | | | |
|---|---|---|---|---|
| 3,757,503 A | * | 9/1973 | Soldavini ...................... | 56/202 |
| 4,523,788 A | * | 6/1985 | Prasad ......................... | 298/11 |
| 4,736,575 A | * | 4/1988 | Fedeli ......................... | 56/202 |
| 4,738,088 A | | 4/1988 | Klever et al. | |
| 4,782,650 A | | 11/1988 | Walker | |
| 4,835,951 A | | 6/1989 | Walker | |
| 4,989,917 A | * | 2/1991 | Schmidt, Jr. ................. | 298/11 |
| 5,193,882 A | * | 3/1993 | Gamaldi ...................... | 298/11 |
| 5,921,073 A | * | 7/1999 | Cash ........................... | 56/202 |
| 6,012,273 A | | 1/2000 | Ogasawara et al. | |
| 6,050,072 A | | 4/2000 | Chabrier et al. | |
| 6,513,312 B1 | * | 2/2003 | Ishimori et al. ............. | 56/203 |
| 6,584,757 B2 | * | 7/2003 | Komorida et al. ............ | 56/202 |
| 2002/0124542 A1 | | 9/2002 | Ishimori | |

FOREIGN PATENT DOCUMENTS

| | | |
|---|---|---|
| EP | 0 876 749 A1 | 11/1998 |
| EP | 1 138 187 A1 | 10/2001 |
| FR | 2 672 464 A1 | 8/1992 |
| FR | 2 681 216 A1 | 3/1993 |
| FR | 2 746 253 A1 | 9/1997 |
| JP | 08 23744 | 1/1996 |
| JP | 09 009759 | 1/1997 |
| JP | 2001-45829 | 2/2001 |
| JP | 2001-275438 | 10/2001 |
| JP | 2002238324 | 8/2002 |

* cited by examiner

*Primary Examiner*—Árpád Fábián Kovács
(74) *Attorney, Agent, or Firm*—Webb Ziesenheim Logsdon Orkin & Hanson, P.C.

(57) ABSTRACT

A lawn mower for transmitting grass clippings cut by a mower unit (4) to a grass catcher (32) through a grass collecting duct (31). The lawn mower includes a body frame (1), and a bracket unit (39) attached to a rear of the body frame (1). A gate frame (40) is provided for supporting the grass catcher (32) to be displaceable between a collecting posture with an opening of the grass catcher (32) opposed to the grass collecting duct (31), and a discharging posture with the opening directed downward. The gate frame (40) defines first connecting areas (50) for enabling connection to a lift link mechanism (47) for vertically moving the gate frame (40) relative to the body frame (1), and second connecting areas (60) for enabling direct connection to the bracket unit (39). The first connecting areas (50) have connecting pins (51) connectable to distal ends of swing arms (45) of the lift link mechanism (47) used according to circumstances. The second connecting areas (60) have connecting bores (49) alignable with connecting bores (48) formed in the bracket unit (39).

16 Claims, 8 Drawing Sheets

LAWN MOWER HAVING A DISPLACEABLE GRASS CATCHER

BACKGROUND OF THE INVENTION

1. Field of the Invention

This invention relates to a lawn mower for transmitting grass clippings cut by a mower unit to a grass catcher through a grass collecting duct.

2. Description of the Related Art

A conventional grass catcher mounting structure of a lawn mower noted above is known from Japanese Patent Publication (Unexamined) No. 2001-45829, for example. In this structure according to low dump specifications, a grass catcher is connected to a connecting unit erected at the rear end of a vehicle body, to be switchable between a collecting posture for collecting grass clippings from a grass collecting duct attached to the vehicle body, and a discharging posture for discharging the grass clippings collected. The grass catcher is switchable between the collecting posture and discharging posture in a low position immediately rearward of the grass collecting duct.

A different grass catcher mounting structure is known from Japanese Patent Publication (Unexamined) No. 2001-275438, for example. In this structure according to high dump specifications, a lift link mechanism is connected to a mounting frame erected at the rear end of a vehicle body. The lift link mechanism includes swing links vertically pivotably connected to upper positions of the mounting frame, and a first hydraulic cylinder extending between the mounting frame and one of the swing links. A grass catcher is supported by free ends of the swing links of the lift link mechanism to be pivotable between a collecting posture for collecting grass clippings from a grass collecting duct attached to the vehicle body, and a discharging posture for discharging the grass clippings collected. The grass catcher is switchable to the discharging posture in a high position remote from the grass collecting duct.

In the prior art noted above, where a lawn mower is constructed to low dump specifications, a grass catcher mounting structure dedicated to the low dump specifications with components dedicated to the low dump specifications is required. Where a lawn mower is constructed to high dump specifications, a grass catcher mounting structure dedicated to the high dump specifications with components dedicated to the high dump specifications is needed. In some countries or regions, lawn mowers with low dump specifications or lawn mowers with high dump specifications are required. To answer customers' needs promptly, the two different types of lawn mowers must always be manufactured and kept in stock. This imposes a considerable burden of parts management cost and manufacturing cost. A customer needing low dump and high dump lawn mowers suffers the inconvenience of having to purchase the two types of lawn mowers.

SUMMARY OF THE INVENTION

An object of this invention is to enable manufacture of a lawn mower to low dump specifications and a lawn mower to high dump specifications without necessitating heavy parts management cost and manufacturing cost.

Another object of this invention is to provide a lawn mower readily convertible from low dump specifications to high dump specifications, or from high dump specifications to low dump specifications.

The above objects are fulfilled, according to this invention, by a lawn mower for transmitting grass clippings cut by a mower unit to a grass catcher through a grass collecting duct, comprising a body frame, a bracket unit attached to a rear of the body frame, and a gate frame for supporting the grass catcher to be displaceable between a collecting posture with an opening of the grass catcher opposed to the grass collecting duct, and a discharging posture with the opening directed downward, wherein the gate frame defines first connecting areas for enabling connection to a lift link mechanism for vertically moving the gate frame relative to the body frame, and second connecting areas for enabling direct connection to the bracket unit.

According to this invention, the gate frame may be connected directly to the bracket unit of the body frame by using the second connecting areas. Then, the lawn mower has low dump specifications in which the grass catcher is switchable between the collecting posture and discharging posture in a low collecting position immediately rearward of the grass collecting duct. Alternatively, the gate frame may be connected to the body frame through the lift link mechanism by using the first connecting areas. Then, the lawn mower has high dump specifications in which the grass catcher is switchable between the collecting posture and discharging posture in a high discharging position remote from the grass collecting duct.

Thus, the bracket, the grass catcher, a posture switching actuator and the gate frame are components common to the low dump specifications and high dump specifications. Only the lift link mechanism is a component dedicated to the high dump specifications. A great reduction is made in the parts management cost and manufacturing cost, compared with the prior art, when constructing a lawn mower to both the low dump specifications and high dump specifications.

To increase rigidity of the gate frame, in one preferred embodiment of this invention, the gate frame includes a box frame having substantially the same section as the opening of the grass catcher to form a transitional portion for a flow of grass clippings from the grass collecting duct to the grass catcher, and a front wall for covering a front plane of the box frame, the front wall defining an opening having substantially the same section as the grass collecting duct. In this construction, the first connecting areas and the second connecting areas may be formed on side walls of the box frame.

In a preferred embodiment for simplifying the connection between the gate frame and distal ends of swing arms of the lift link mechanism, the first connecting areas have connecting pins connectable. In a preferred embodiment for simplifying the connection between the bracket unit and gate frame, the second connecting areas have connecting bores alignable with connecting bores formed in the bracket unit. The bracket unit and gate frame are fixed to each other by bolt connection.

A lawn mower readily convertible from the high dump specifications to the low dump specifications, according to this invention, comprises a bracket unit attached to the rear of the body frame, and a gate frame for supporting the grass catcher to be displaceable between a collecting posture with an opening of the grass catcher opposed to the grass collecting duct, and a discharging posture with the opening directed downward, wherein the gate frame is selectively connectable to, to be supported by, the body frame through a lift link mechanism for vertically moving the gate frame, and connectable directly to, to be supported by, the bracket unit.

Other features and advantages of this invention will be apparent from the following description of the embodiment to be taken with reference to the drawings.

DESCRIPTION OF THE PREFERRED EMBODIMENT

Figure 1:
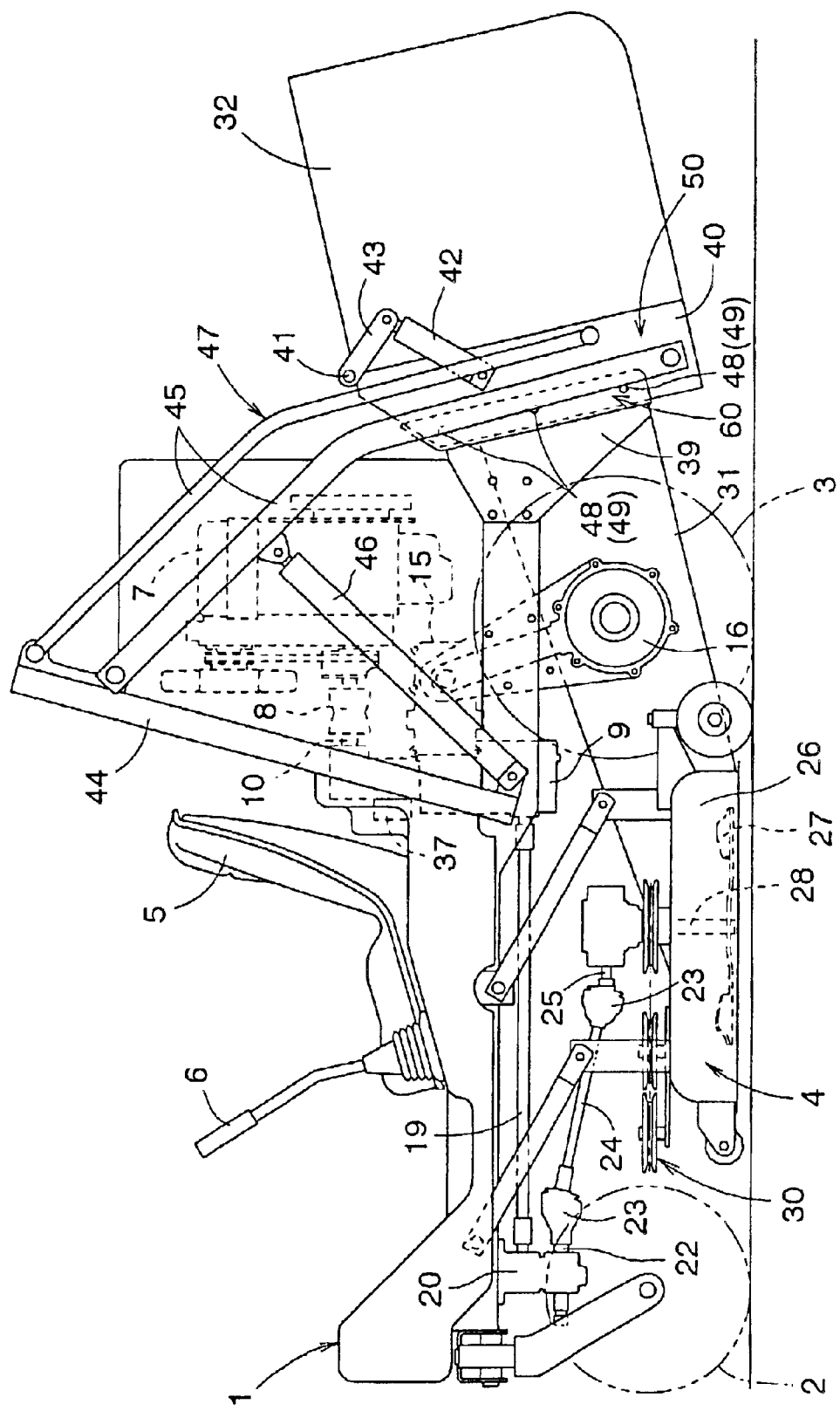
FIG. 1 is a side elevation of a lawn mower constructed to high dump specifications.

FIG. 1 shows a side elevation of a lawn mower having a pair of right and left caster type wheels 2 acting as front wheels disposed at the front of a body frame 1 and a pair of right and left drive wheels 3 acting as rear wheels disposed at the rear of body frame 1. This lawn mower is the mid-mount type with a mower unit 4 vertically movably supported by the body frame 1 between the front wheels 2 and rear wheels 3.

As shown in FIGS. 1 through 4, the body frame 1 has a driver's seat 5 disposed over the mower unit 4, and an engine 7 mounted rearwardly of the driver's seat 5. Shift levers 6 are arranged at the right and left sides of the driver's seat 5. Drive is transmitted from the engine 7 through a ball joint 8 that allows displacements of a transmission axis due to vibration, to an input shaft 10 of a transmission case 9 disposed below and forwardly of the engine 7. In the transmission case 9 drive is transmitted from the input shaft 10 through three spur gears 11 to a drive distributing mechanism 12. From this drive distributing mechanism 12 propelling drive is transmitted through a pair of bevel gears 13 and a transversely extending relay shaft 14 to right and left HSTs (hydrostatic stepless transmissions) 15. Drive having undergone a change speed operation by each of the right and left HSTs 15 is transmitted to an axle 3a of the corresponding drive wheel 3 through a reduction mechanism 17 mounted in a right or left axle case 16.

In this lawn mower, drive from the engine 7 is transmitted independently to the right and left drive wheels 3 through the corresponding right and left HSTs 15. The right and left shift levers 6 are linked to the right and left HSTs 15, respectively, and are operable to shift the right and left HSTs 15 independently of each other. The lawn mower is switchable between a straight running state with the right and left HSTs 15 providing the same speed to rotate the right and left drive wheels 3 at equal speed, and a turning state with the right and left HSTs 15 providing different speeds to rotate the right and left drive wheels 3 at different speeds. Since HSTs 15 are switchable between forward drive and backward drive, the turning state includes a large turning state produced when the right and left drive wheels 3 are driven at different speeds in the same direction, a pivot turning state produced when one of the right and left drive wheels 3 is stopped, and a spin turning state produced when the right and left drive wheels 3 are driven in opposite directions.

Figure 2:
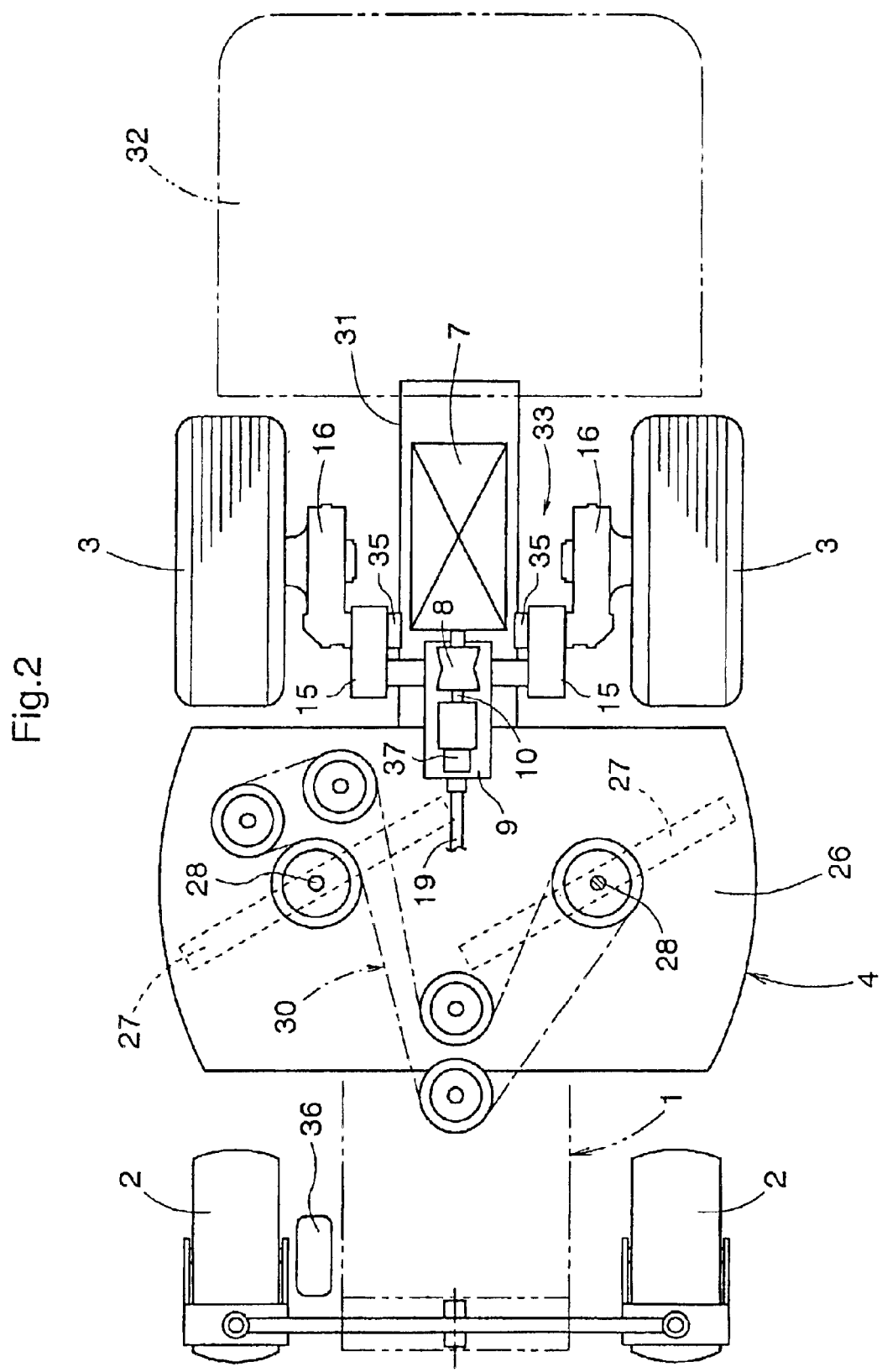
FIG. 2 is a plan view of a principal portion of the lawn mower.
Figure 4:
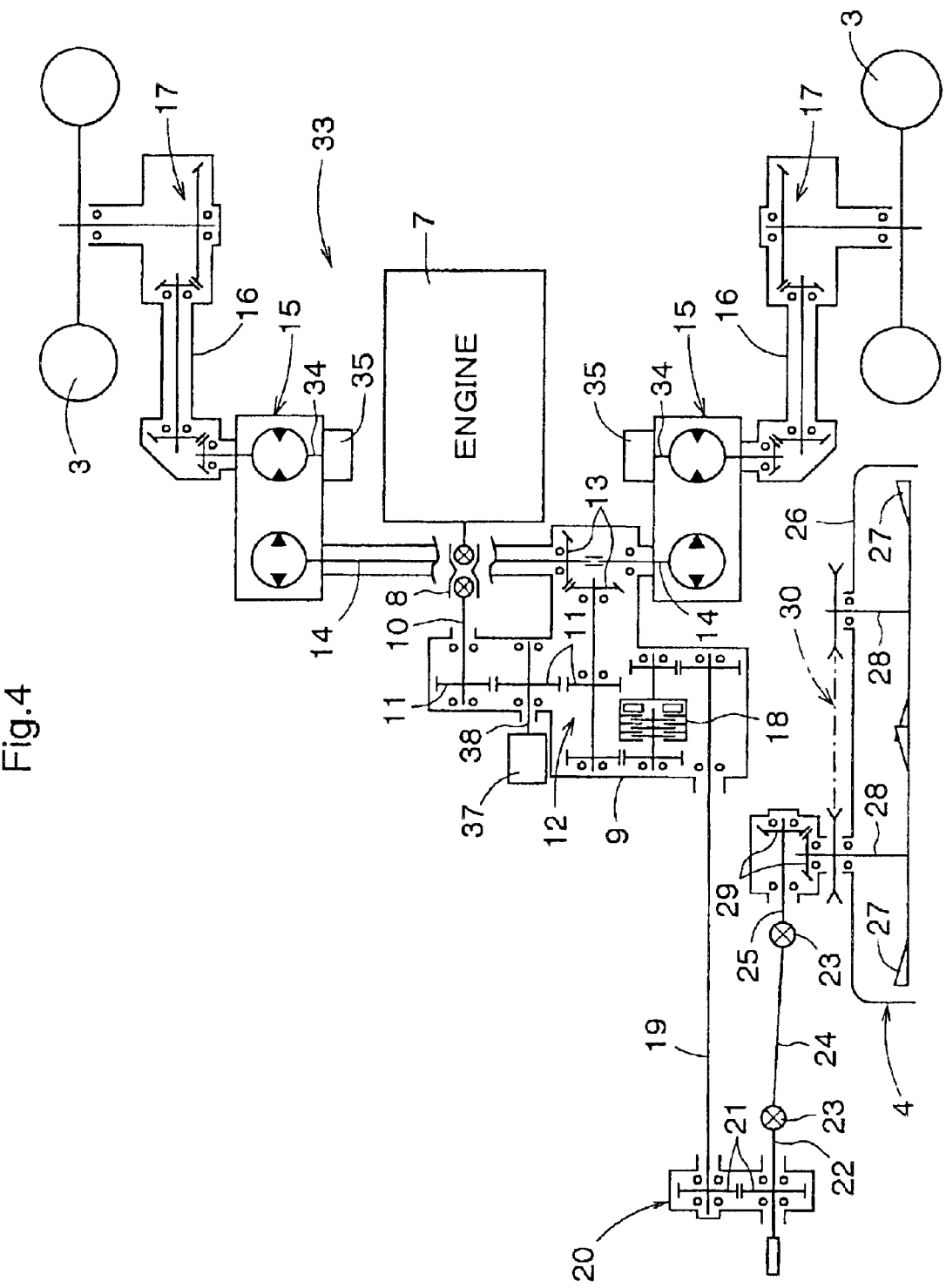
FIG. 4 is a schematic view of a transmission system of the lawn mower.

As shown in FIGS. 1, 2 and 4, the drive distributing mechanism 12 includes a multi-disk type working clutch 18 for transmitting and breaking working power. The working power emerging from the working clutch 18 is transmitted through a first transmission shaft 19 extending fore and aft and a pair of spur gears 21 mounted in a front case 20 at the front of the vehicle body 1 to a power takeoff shaft 22. From the rear end of this power takeoff shaft 22 power is transmitted through a pair of ball joints 23 and a second transmission shaft 24 extending fore and aft to an input shaft 25 of mower unit 4.

Power may be taken also from the forward end of the power takeoff shaft 22. By using the forward end of this power takeoff shaft 22, though not shown in the drawings, power may be transmitted easily to an auxiliary working implement attached to the front of the body frame 1. Where, for example, the auxiliary working implement an auxiliary mower unit having a smaller cutting width than the mower unit 4, the auxiliary mower unit may enter a narrow space between trees which is inaccessible to the mower unit 4. Thus, grass may easily cut in such narrow locations. Where such an auxiliary mower unit is positioned laterally of the mower unit 4 to increase the cutting width, a grass cutting operation over a large working area may be carried out with improved efficiency.

The mower unit 4 has a housing 26 containing a pair of right and left grass cutting blades 27 rotatable about vertical support shafts 28. The working power transmitted to the input shaft 25 is transmitted to one of the support shafts 28 through a pair of bevel gears 29, and then transmitted from this support shaft 28 to the other support shaft 28 through a belt transmission mechanism 30. The right and left blades 27 are thereby driven to rotate in opposite directions at the same speed, with rotating tracks partly overlapping each other, and the blades moving backward in the overlapping locations. The rotating blades 27 cut grass and generate carrier air flows. The air flows entrain and transport grass clippings rearward through a discharge opening, not shown, formed in a transversely middle position of a rear wall of the housing 26.

As shown in FIGS. 1 and 2, the grass clippings discharged from the discharge opening of the housing 26 are guided by a grass collecting duct 63 connected to the discharge opening, to enter a grass catcher 60 attached to the rear of the body frame 1.

As shown in FIGS. 1 through 4, the right and left HSTs 15 and reduction mechanisms 17 are arranged right and left symmetrical positions opposed to each other across the drive distributing mechanism 12 disposed in the middle position transversely of the body frame 1. Thus, the drive distributing mechanism 12, and right and left HSTs 15 and reduction mechanisms 17 constitute a gate-shaped structure defining a space 33 in a lower, transversely middle position. The right and left reduction mechanisms 17 are arranged outwardly of the corresponding HSTs 15. This arrangement secures the relatively large space 33. The grass collecting duct 63 is disposed to extend through a transversely middle position in the space 33.

Thus, the heavy right and left HSTs 15 and reduction mechanisms 17 are symmetrically arranged right and left, and the light, hollow grass collecting duct 63 is disposed to extend through the transversely middle position in the space 33 defined by the HSTs 15 and reduction mechanisms 17. The lawn mower has improved right and left balance, and grass clippings discharged from the mower unit 4 may collect in the grass catcher 60 in a balanced way. Moreover, with the right and left reduction mechanisms 17 arranged outwardly of the corresponding HSTs 15, the reduction mechanisms 17 effectively reduces the chances of damage of the relatively expensive HSTs 15 due to contact with other objects. The relatively large space 33 facilitates positioning of the grass collecting duct 63, and increases the distance between the right and left drive wheels 3 to improve the stability of the entire lawn mower.

Figure 3:
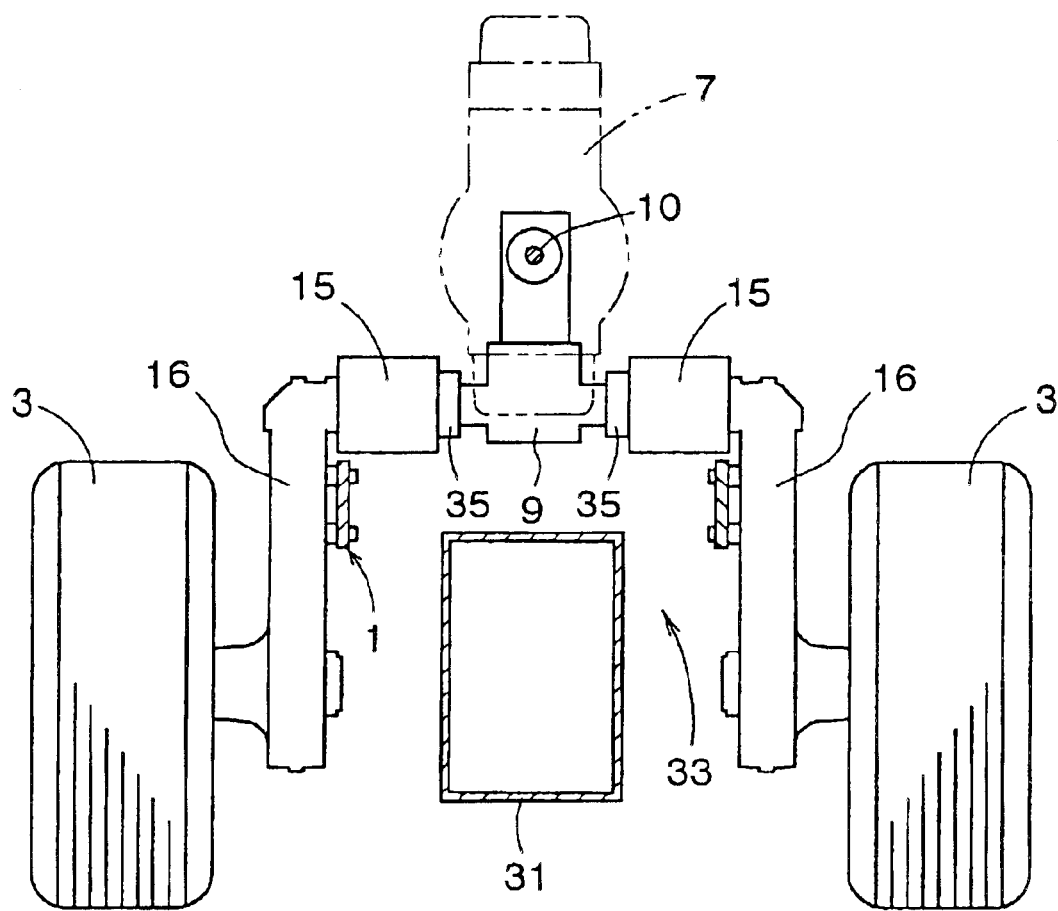
FIG. 3 is a rear view of a principal portion of the lawn mower.

As shown in FIGS. 2 through 4, wet type brakes 35 are disposed inwardly of the right and left HSTs 15 for braking output shafts 34 of the corresponding HSTs 15 to brake the corresponding drive wheels 3, respectively. These right and left wet type brakes 35 are linked to a single brake pedal 36 disposed in a right forward position of the body frame 1.

That is, the wet type brakes 35 arranged inwardly of the right and left HSTs 15 are effectively protected from damage due to contact with other objects. With the right and left wet type brakes 35 linked to the single brake pedal 36, a depression of the brake pedal 36 causing the right and left both wet type brakes 35 to take braking action simultaneously, to brake the vehicle body without deflection.

Numeral 37 in FIGS. 1, 2 and 4 denotes a gear pump driven by rotation of an intermediate shaft 38 rotatable with the middle one of the three spur gears 11 arranged from the input shafts 10 of transmission case 9 to the drive distributing mechanism 12.

Figure 5:
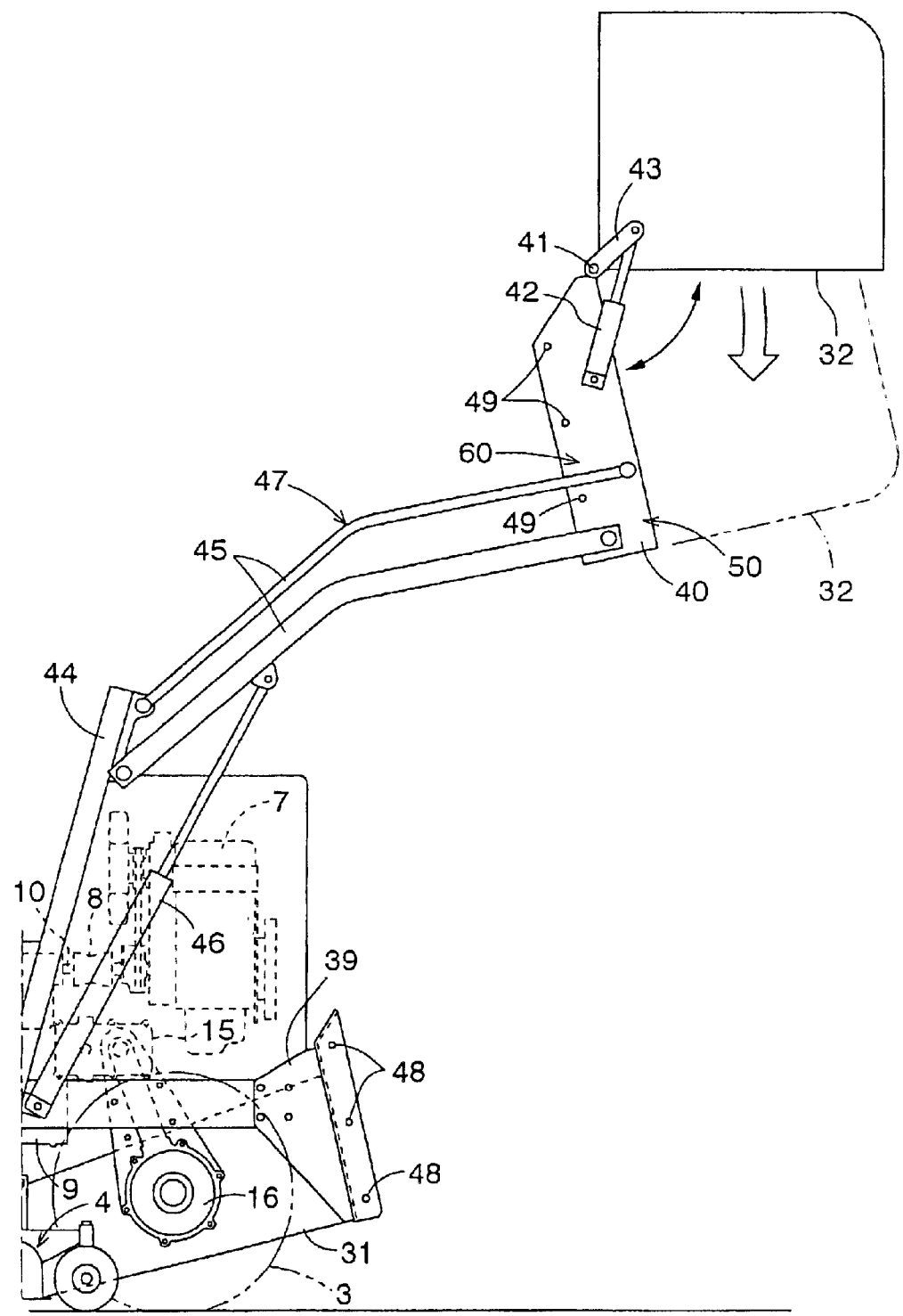
FIG. 5 is a side view of a principal portion of the lawn mower showing a grass discharge state in a high dump mode.
Figure 6:
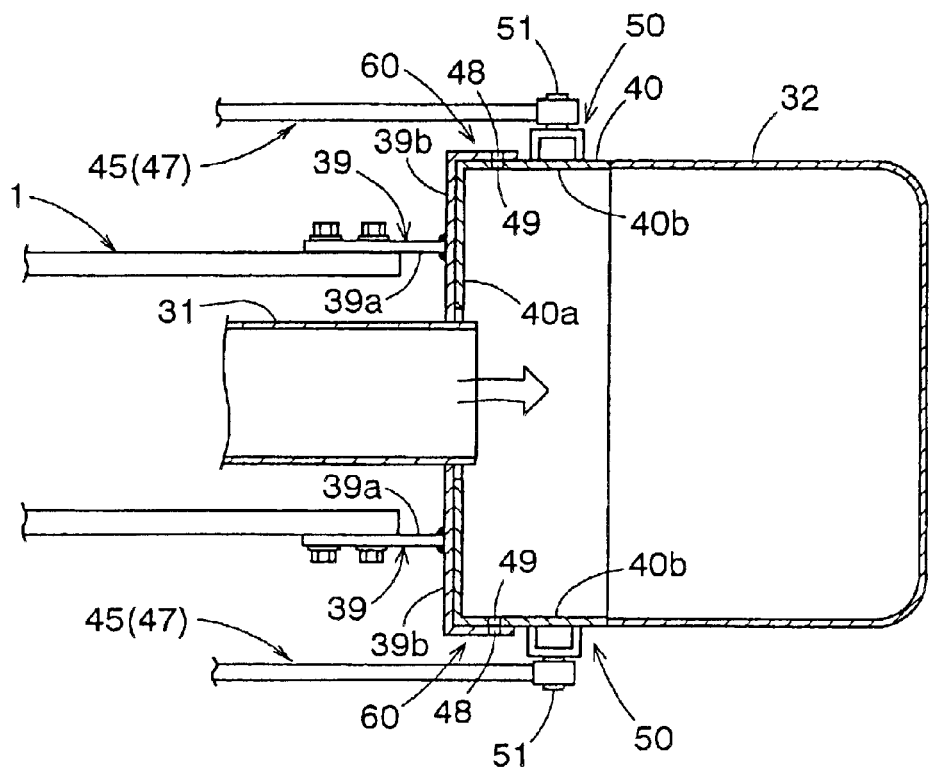
FIG. 6 is a plan view in cross section of a principal portion showing a support frame mounted to high dump specifications.

As shown in FIGS. 1, 5, and 6, a gate frame 40 includes a box frame having substantially the same section as an opening of the grass catcher 32 to form a transitional portion for the flow of grass clippings from the grass collecting duct 31 to the grass catcher 32, and a front wall 40a for covering the front of the box frame. The front wall 40a defines an opening having substantially the same section as the grass collecting duct 31.

The grass catcher 32 is connected to the gate frame 40 to be vertically pivotable about a transverse support shaft 41 disposed at an upper end of the gate frame 40. The gate frame 40 has a swing link 43 connected to the support shaft 41, and a hydraulic cylinder 42, which is one example of actuators, for swinging the swing link 43 about the support shaft 41. Thus, the grass catcher 32 is switchable between a collecting posture with the opening at the front of the grass catcher 32 opposed to the gate frame 40, and a discharging posture with the opening opposed to the ground.

The gate frame 40 has side walls 40b on each of which a first connecting area 50 is secured for enabling connection to a lift link mechanism 47. The first connecting area 50 has connecting pins 51 projecting outward.

The lift link mechanism 47 includes two pairs of upper and lower swing arms 45 extending light and left upper end positions of a rollover protection frame 44 erected on the body frame 1 to corresponding lower positions of the side walls of the gate frame 40 to form a parallelogram link at each side, and a hydraulic cylinder 46 extending from the rollover protection frame 44 to the lower left arm 45. The swing arms 45 are pivotally connected at distal ends thereof to the connecting pins 51 projecting from the side walls 40b of the gate frame 40.

The hydraulic cylinder 46 of the lift link mechanism 47 is operable to move the gate frame 40 between a lower collecting position for communicating with the grass collecting duct 31, and an upper discharging position above the lower collecting position and far up rearward from the rear end of the body frame 1.

That is, this lawn mower is constructed to high dump specifications, in which the grass catcher 32 is switchable between the collecting posture and discharging posture in the upper discharging position far up rearward from the grass collecting duct 31.

The body frame 1 has a bracket unit 39 attached to the rear end thereof. The bracket unit 39 includes a pair of right and left body frame fixing portions 39a bolted to the body frame 1, and a pair of right and left gate frame receiving portions 39b. Each gate frame receiving portion 39b has a bottom wall and a side wall for receiving a corner of the gate frame 40 in the lower collecting position. The bottom wall of the bracket unit 39 defines an opening for receiving and supporting the rear end of the grass collecting duct 31.

On the other hand, a second connecting area 60 is secured on each side wall 40b of the gate frame 40 for directly connecting the bracket unit 39 and gate frame 40. The second connecting area 60 has connecting bores 49 formed therein. The gate frame 40 and bracket unit 39 may be fixedly connected to each other by bolts extending through these connecting bores 49 and connecting bores 48 formed in side walls of the bracket unit 39.

Figure 7:
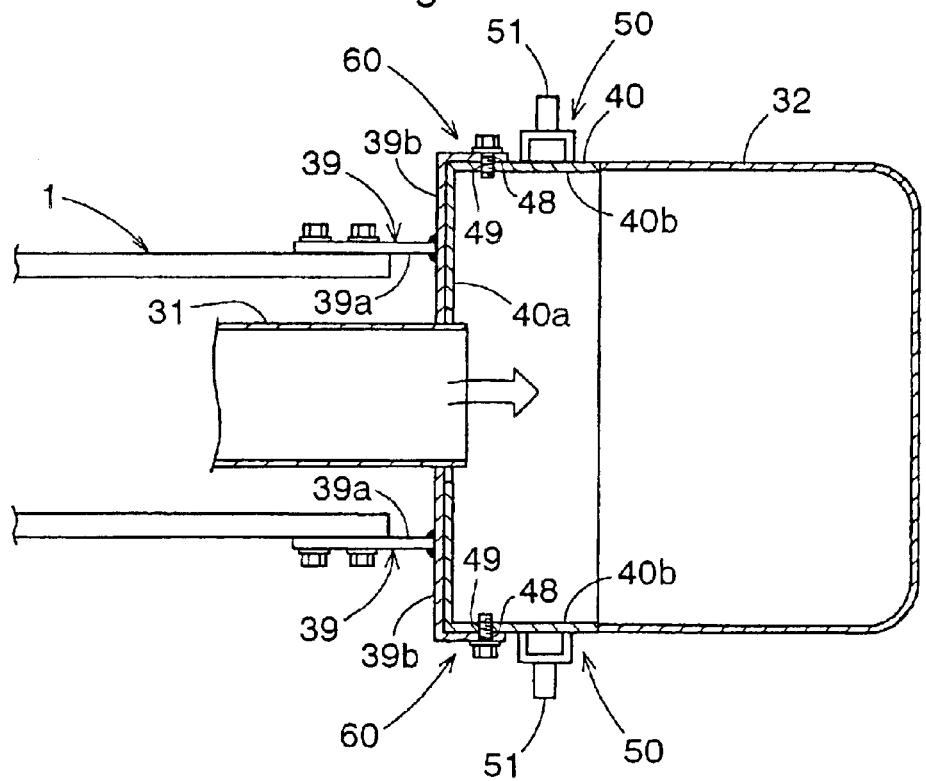
FIG. 7 is a plan view in cross section of a principal portion showing a support frame mounted to low dump specifications.
Figure 8:
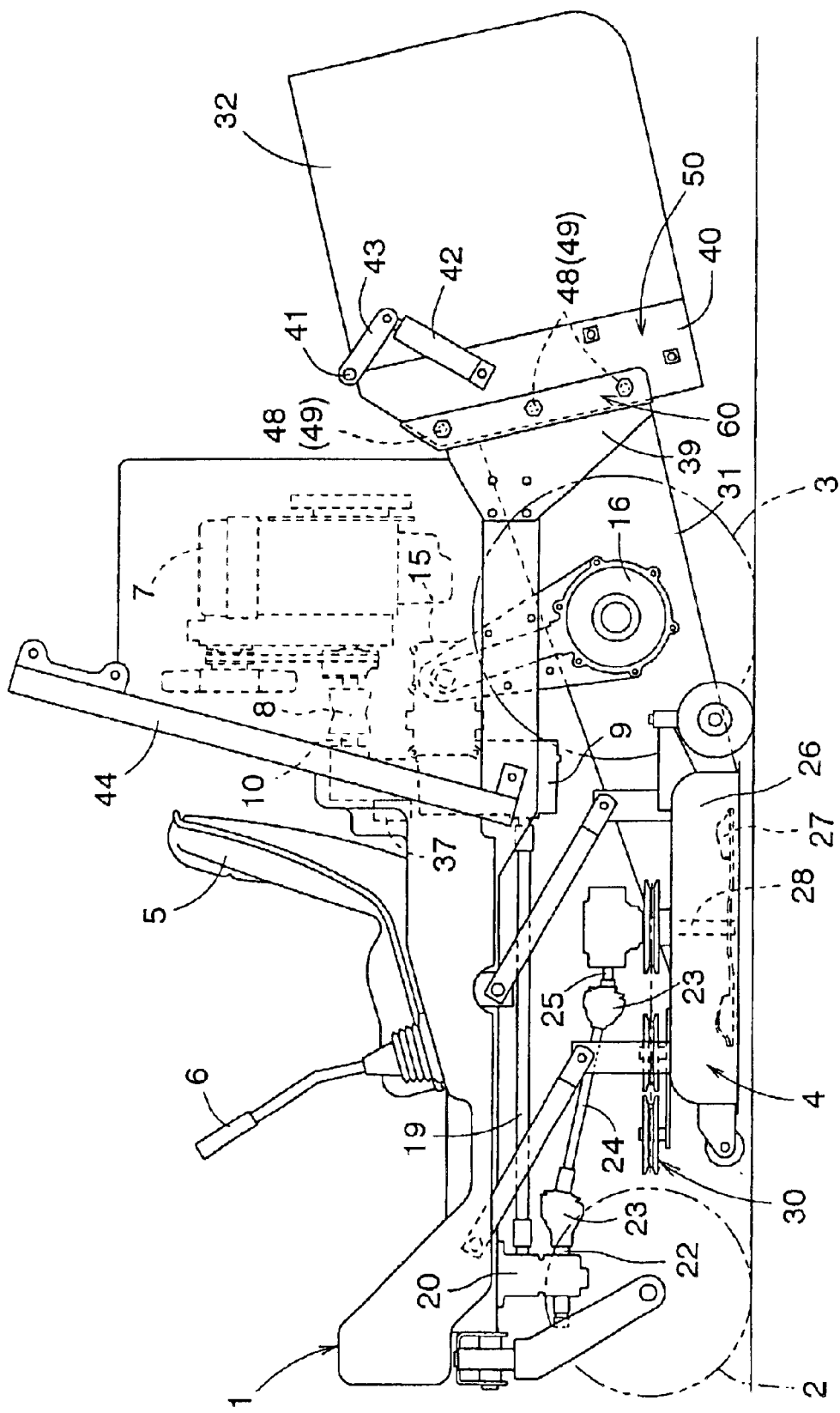
FIG. 8 is a side elevation of a lawn mower constructed to low dump specifications.
Figure 9:
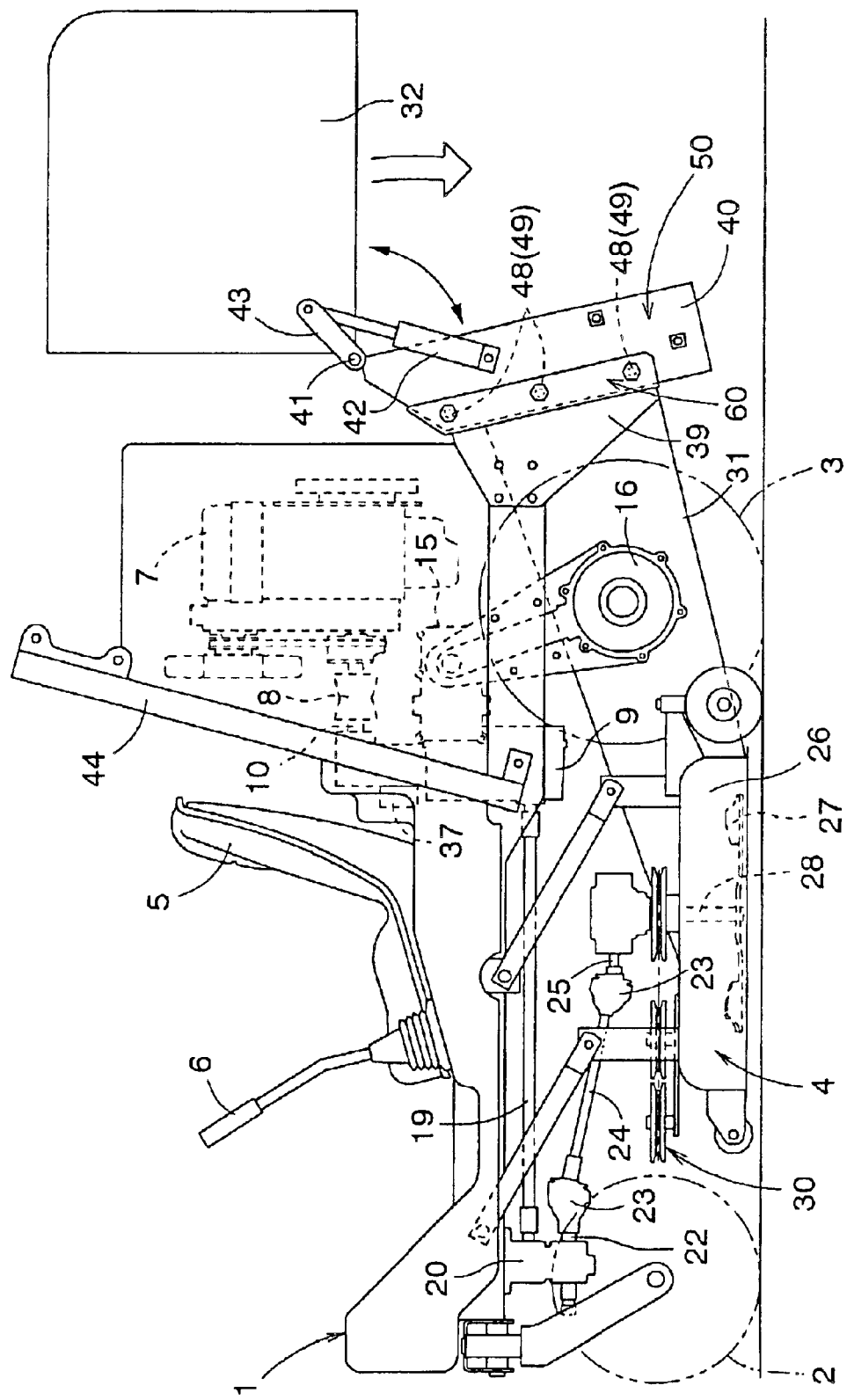
FIG. 9 is a side view of a principal portion of the lawn mower showing a grass discharge state in a low dump mode.

As a result, as shown in FIGS. 7 through 9, the gate frame 40 may be connected directly to the bracket unit 39, without using the lift link mechanism 47, in the lower collecting position in communication with the grass collecting duct 31.

That is, in this lawn mower, the gate frame 40 having the grass catcher 32 and hydraulic cylinder 42 may be selectively connected to the body frame 1 through the lift link mechanism 47 by using the first connecting areas 50 (or the connecting pins 51) as shown in FIGS. 1, 5 and 6, and fixedly connected to the bracket unit 39 fixed to the body frame 1, with the lift link mechanism 47 omitted, by the second connecting areas 60 (or connecting bores 49) as shown in FIGS. 7 through 9. By this simple selecting operation, the lawn mower may readily be converted between the high dump specifications in which, as shown in FIG. 5, the grass catcher 32 is switchable between the collecting posture and discharging posture in the upper discharging position far up rearward from the grass collecting duct 31, and the low dump specifications in which, as shown in FIGS. 8 and 9, the grass catcher 32 is switchable between the collecting posture and discharging posture in the lower collecting position immediately rearward of the grass collecting duct 31.

(1) The lawn mower may be the front mower type having the mower unit 4 attached to the front of the body frame 1.

(2) In the above embodiment, the rollover protection frame 44 is used as a prop for the lift link mechanism 47. Instead, the lawn mower may have detachable props dedicated to the link mechanism 47.

What is claimed is:

1. A lawn mower for transmitting grass clippings cut by a mower unit to a grass catcher through a grass collecting duct, the lawn mower being convertible between a high dump specification and a low dump specification, the lawn mower comprising:

a body frame;

a bracket unit attached to said body frame adjacent to a rear end region of said grass collecting duct; and a gate frame for supporting said grass catcher to be displaceable between a collecting posture with an opening of said grass catcher opposed to said grass collecting duct, and a discharging posture with said opening directed downward;

wherein said gate frame defines first connecting areas for enabling connection to a link mechanism for vertically moving said gate frame relative to said body frame, and second connecting areas for enabling direct connection to said bracket unit;

when the lawn mower is converted to said high dump specification, said grass catcher is displaced from said collecting posture to said discharging posture with entire said gate frame moved upward away from said bracket unit the link mechanism, and when the lawn mower is converted to said low dump specification, said grass catcher is displaced from said collecting posture to said discharging posture with said gate frame directly connected to said bracket unit.

2. A lawn mower as defined in claim 1, wherein, when the lawn mower is converted to said low dump specification, said grass catcher is displaced from said collecting posture to said discharging posture by causing a second link mechanism to displace the grass catcher and said gate frame relative to one another.

3. A lawn mower as defined in claim 1, wherein said gate frame includes a box frame having substantially the same section as said opening of said grass catcher to form a transitional portion for a flow of grass dippings from said grass collecting duct to said grass catcher, and a front wall for covering a front plane of said box frame, said front wall defining an opening having substantially the same section as said grass collecting duct.

4. A lawn mower as defined in claim 3, wherein said first connecting areas and said second connecting areas are formed on side walls of said box frame.

5. A lawn mower as defined in claim 1, wherein said first connecting areas have connecting pins connectable to distal ends of swing arms of said lift link mechanism used according to circumstances.

6. A lawn mower as defined in claim 1, wherein said second connecting areas have connecting bores alignable with connecting bores formed in said bracket unit.

7. A lawn mower for transmitting grass clippings cut by a mower unit to a grass catcher through a grass collecting duct, comprising:

a body frame;

a bracket unit attached to a rear of said body frame; and a gate frame for supporting said grass catcher to be displaceable between a collecting posture with an opening of said grass catcher opposed to said grass collecting duct, and a discharging posture with said opening directed downward;

wherein said gate frame defines first connecting areas for enabling connection to a lift link mechanism for vertically moving said gate frame relative to said body frame, and second connecting areas for enabling direct connection to said bracket unit, and wherein said second connecting areas have connecting bores alignable with connecting bores formed in said bracket unit.

8. A lawn mower as defined in claim 7, wherein said gate frame includes a box frame having substantially the same section as said opening of said grass catcher to form a transitional portion for a flow of grass clippings from said grass collecting duct to said grass catcher, and a front wall for covering a front plane of said box frame, said front wall defining an opening having substantially the same section as said grass collecting duct.

9. A lawn mower as defined in claim 8, wherein said first connecting areas and said second connecting areas are formed on side walls of said box frame.

10. A lawn mower as defined in claim 7, wherein said first connecting areas have connecting pins connectable to distal ends of swing arms of said lift link mechanism used according to circumstances.

11. A lawn mower as defined in claim 7, wherein the lawn mower is convertible between a high dump specification and a low dump specification, and when the lawn mower is converted to said high dump specification, said grass catcher is displaced from said collecting posture to said discharging posture with entire said gate frame moved upward away from said bracket unit by a link mechanism, and when the lawn mower is converted to said low dump specification, said grass catcher is displaced from said collecting posture to said discharging posture with said gate frame directly connected to said bracket unit.

12. A lawn mower for transmitting grass clippings cut by a mower unit to a grass catcher through a grass collecting duct, the lawn mower comprising:

a body frame;

a bracket unit attached to said body frame adjacent to a rear end region of said grass collecting duct; and a gate frame for supporting said grass catcher to be displaceable between a collecting posture with an opening of said grass catcher opposed to said grass collecting duct, and a discharging posture with said opening directed downward;

wherein said gate frame is selectively connectable to and supported by said body frame between a first assembled mode in which said gate frame is indirectly supported by said body frame through a link mechanism for vertically moving said gate frame, and a second assembled mode in which said gate frame is directly supported by said bracket unit;

when said first assembled mode is selected, said grass catcher is displaced from said collecting posture to said discharging posture with entire said gate frame moved upward away from said bracket unit by the link mechanism; and when said second assembled mode is selected, said grass catcher is displaced from said collecting posture to said discharging posture with said gate frame directly connected to said bracket unit.

13. A lawn mower as defined in claim 12, wherein the lawn mower is convertible between a high dump specification and a low dump specification.

14. A lawn mower as defined in claim 13, wherein, when the lawn mower is converted to said low dump specification, said grass catcher is displaced from said collecting posture to said discharging posture by causing a second link mechanism to displace the grass catcher and said gate frame relative to one another.

15. A lawn mower as defined in claim 13, wherein, when the lawn mower is converted to said high dump specification, said first assembled mode is selected.

16. A lawn mower as defined in claim 12, wherein said gate frame defines first connecting areas for enabling connection to a link mechanism for vertically moving said gate frame relative to said body frame, and second connecting areas for enabling direct connection to said bracket unit, said second connecting areas have connecting bores alignable with connecting bores formed in said bracket unit.

* * * * *

UNITED STATES PATENT AND TRADEMARK OFFICE
CERTIFICATE OF CORRECTION

PATENT NO. : 6,840,029 B2
DATED : January 11, 2005
INVENTOR(S) : Ishimori

It is certified that error appears in the above-identified patent and that said Letters Patent is hereby corrected as shown below:

Column 7,
Line 12, "unit the" should read -- unit by the --.
Line 26, "grass dippings" should read -- grass clippings --.

Signed and Sealed this

Sixteenth Day of August, 2005

JON W. DUDAS
*Director of the United States Patent and Trademark Office*